(12) United States Patent
Becker et al.

(10) Patent No.: US 12,210,536 B2
(45) Date of Patent: *Jan. 28, 2025

(54) SYSTEMS AND METHODS FOR CUSTOMIZED ELECTRONIC COMMUNICATIONS

(71) Applicant: Yahoo Ad Tech LLC, New York, NY (US)

(72) Inventors: Marcel Becker, San Jose, CA (US); Seth Halvaksz, Falls Church, VA (US); William G. Wetherell, San Francisco, CA (US); Alan Eyzaguirre, London (GB)

(73) Assignee: Yahoo Ad Tech LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/333,267

(22) Filed: Jun. 12, 2023

(65) Prior Publication Data

US 2023/0394050 A1     Dec. 7, 2023

Related U.S. Application Data

(63) Continuation of application No. 17/395,602, filed on Aug. 6, 2021, now Pat. No. 11,714,817, which is a
(Continued)

(51) Int. Cl.
*G06F 17/30* (2006.01)
*G06F 16/2457* (2019.01)
*G06Q 30/00* (2023.01)
*G06Q 30/0241* (2023.01)
*H04L 51/046* (2022.01)

(52) U.S. Cl.
CPC ....... *G06F 16/24578* (2019.01); *G06Q 30/00* (2013.01); *G06Q 30/0241* (2013.01); *H04L 51/046* (2013.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS 6,346,952 B1 * 2/2002 Shtivelman ........... G06F 16/345
707/999.005
6,728,679 B1 * 4/2004 Strubbe ................. G06F 3/011
704/270.1

(Continued)

*Primary Examiner* — Hung D Le
(74) *Attorney, Agent, or Firm* — Bookoff McAndrews, PLLC

(57) ABSTRACT

The present disclosure relates to systems and methods customizing electronic communications. A future event associated with a first user may be determined, and a second user that is associated with the first user may be identified. A plurality of communications involving the first user and the second user may be analyzed. A selection rule may be applied based on the analyzed plurality of communications, the selection rule identifying content from the database. Content from the database may be selected based on the application of the selection rule. An electronic message may be provided to the first user identifying the future event, and the selected content may be provided to the first user.

20 Claims, 7 Drawing Sheets

Figure 1:
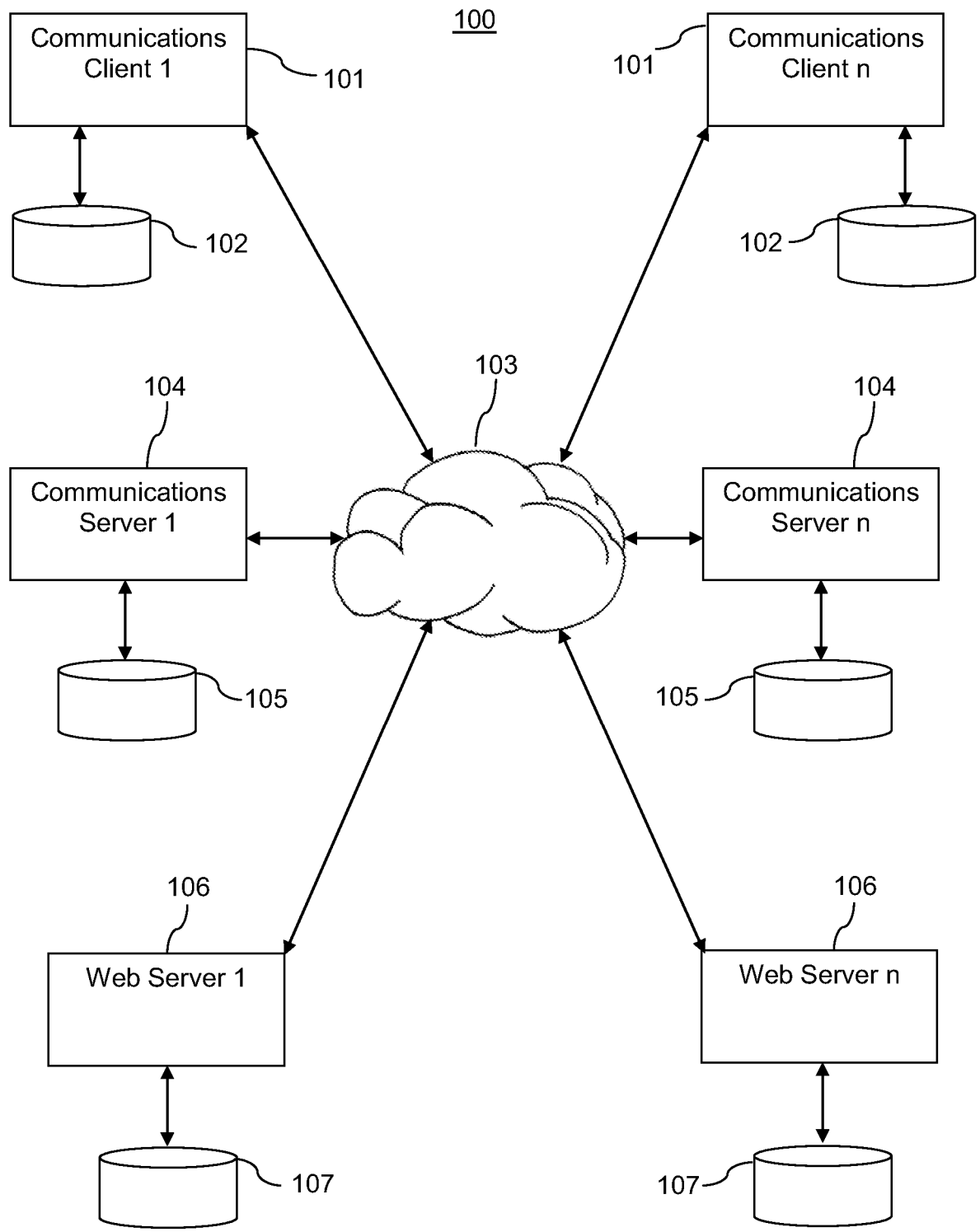

Related U.S. Application Data continuation of application No. 16/133,138, filed on Sep. 17, 2018, now Pat. No. 11,120,028, which is a continuation of application No. 14/745,559, filed on Jun. 22, 2015, now Pat. No. 10,114,869, which is a continuation of application No. 14/096,135, filed on Dec. 4, 2013, now Pat. No. 9,081,824, which is a continuation of application No. 13/242,301, filed on Sep. 23, 2011, now Pat. No. 8,612,477.

(60) Provisional application No. 61/386,376, filed on Sep. 24, 2010.

(56) References Cited

U.S. PATENT DOCUMENTS

| | | | | |
|---|---|---|---|---|
| 6,731,307 | B1* | 5/2004 | Strubbe | H04N 21/466 715/764 |
| 7,895,284 | B2* | 2/2011 | Kim | H04M 3/5322 709/218 |
| 7,899,871 | B1* | 3/2011 | Kumar | G06Q 10/107 709/206 |
| 8,108,414 | B2* | 1/2012 | Stackpole | H04L 67/52 707/758 |
| 8,108,501 | B2* | 1/2012 | Birnie | H04W 4/02 709/217 |
| 8,126,891 | B2 | 2/2012 | Laxman et al. | |
| 8,150,844 | B2* | 4/2012 | Redstone | H04L 67/535 706/14 |
| 8,229,873 | B1* | 7/2012 | Dolan | G06N 5/048 706/45 |
| 8,504,621 | B2* | 8/2013 | Ruff | G06Q 30/02 709/206 |
| 8,612,477 | B2 | 12/2013 | Becker et al. | |
| 8,626,575 | B1* | 1/2014 | Gong | G06Q 30/0251 705/14.54 |
| 8,768,379 | B2* | 7/2014 | Busch | G06Q 30/0245 455/456.1 |
| 8,903,843 | B2* | 12/2014 | Farrelly | G06F 16/435 707/750 |
| 8,909,623 | B2* | 12/2014 | Yehaskel | G06Q 30/02 707/723 |
| 9,009,177 | B2* | 4/2015 | Zheng | G06F 16/444 707/758 |
| 2002/0095481 | A1 | 7/2002 | George | |
| 2005/0071328 | A1 | 3/2005 | Lawrence | |
| 2005/0149395 | A1* | 7/2005 | Henkin | G06Q 30/0273 707/E17.116 |
| 2006/0064431 | A1 | 3/2006 | Kishore et al. | |
| 2006/0085397 | A1 | 4/2006 | D'Urso | |
| 2006/0085419 | A1* | 4/2006 | Rosen | G06Q 30/0267 707/999.009 |
| 2007/0067293 | A1* | 3/2007 | Yu | G06F 16/3346 |
| 2007/0156732 | A1* | 7/2007 | Surendran | G06Q 10/107 |
| 2007/0159926 | A1 | 7/2007 | Prstojevich | |
| 2008/0102856 | A1* | 5/2008 | Fortescue | H04W 4/02 455/456.1 |
| 2008/0126319 | A1* | 5/2008 | Bukai | G06F 16/951 |
| 2008/0133716 | A1* | 6/2008 | Rao | H04L 67/306 709/227 |
| 2008/0294584 | A1 | 11/2008 | Herz | |
| 2009/0077000 | A1 | 3/2009 | Begole et al. | |
| 2009/0089044 | A1 | 4/2009 | Cooper | |
| 2009/0138328 | A1 | 5/2009 | Higgins et al. | |
| 2009/0152349 | A1 | 6/2009 | Bonev et al. | |
| 2009/0157513 | A1 | 6/2009 | Bonev et al. | |
| 2009/0157658 | A1 | 6/2009 | Bonev et al. | |
| 2009/0157693 | A1 | 6/2009 | Palahnuk | |
| 2009/0158173 | A1 | 6/2009 | Palahnuk et al. | |
| 2009/0158200 | A1 | 6/2009 | Palahnuk et al. | |
| 2009/0165022 | A1* | 6/2009 | Madsen | G06Q 10/109 719/318 |
| 2009/0177484 | A1* | 7/2009 | Davis | G06Q 30/02 706/11 |
| 2009/0187467 | A1* | 7/2009 | Fang | G06Q 30/0201 705/7.29 |
| 2009/0199130 | A1* | 8/2009 | Tsern | G04G 21/08 715/810 |
| 2009/0216569 | A1 | 8/2009 | Bonev et al. | |
| 2009/0265163 | A1* | 10/2009 | Li | G06Q 10/10 704/10 |
| 2009/0282013 | A1 | 11/2009 | Joshi | |
| 2009/0287687 | A1 | 11/2009 | Martire | |
| 2010/0057716 | A1* | 3/2010 | Stefik | G06F 16/355 707/E17.108 |
| 2010/0100517 | A1 | 4/2010 | Laxman et al. | |
| 2010/0138452 | A1* | 6/2010 | Henkin | G06Q 30/02 707/803 |
| 2010/0161580 | A1 | 6/2010 | Chipman | |
| 2010/0161595 | A1 | 6/2010 | Martin | |
| 2010/0169153 | A1 | 7/2010 | Hwacinski et al. | |
| 2010/0169319 | A1 | 7/2010 | Nigul | |
| 2010/0205541 | A1* | 8/2010 | Rapaport | G06Q 30/02 715/753 |
| 2010/0293170 | A1* | 11/2010 | Hall | G06F 16/353 707/750 |
| 2010/0312769 | A1* | 12/2010 | Bailey | H04L 51/52 707/769 |
| 2011/0078157 | A1 | 3/2011 | Sun | |
| 2011/0106895 | A1* | 5/2011 | Ventilla | H04L 12/66 709/204 |
| 2011/0113051 | A1* | 5/2011 | Lindahl | G06F 16/24578 711/170 |
| 2011/0125739 | A1* | 5/2011 | Wexler | G06F 16/9577 707/723 |
| 2011/0145822 | A1 | 6/2011 | Rowe | |
| 2011/0161286 | A1 | 6/2011 | Feliberti | |
| 2011/0184806 | A1 | 7/2011 | Chen | |
| 2011/0191311 | A1* | 8/2011 | Polonsky | G06F 16/335 707/706 |
| 2011/0225239 | A1* | 9/2011 | Kansal | G06Q 10/10 709/204 |
| 2011/0252027 | A1 | 10/2011 | Chen | |
| 2011/0282750 | A1 | 11/2011 | Rosen | |
| 2011/0302117 | A1 | 12/2011 | Pinckney | |
| 2011/0306194 | A1 | 12/2011 | Yeh | |
| 2011/0307562 | A1 | 12/2011 | Chakra | |
| 2012/0016863 | A1 | 1/2012 | Bernhardt | |
| 2012/0030210 | A1 | 2/2012 | Sankhla et al. | |
| 2012/0036182 | A1 | 2/2012 | Slolorz et al. | |
| 2012/0084246 | A1 | 4/2012 | Gavrillescu | |
| 2012/0246100 | A1* | 9/2012 | Shehata | G06F 16/345 707/706 |
| 2013/0290306 | A1* | 10/2013 | Kast | G06F 16/95 707/722 |
| 2014/0040240 | A1* | 2/2014 | Yang | G06F 16/951 707/722 |
| 2014/0310295 | A1 | 10/2014 | Stivoric | |

\* cited by examiner

SYSTEMS AND METHODS FOR CUSTOMIZED ELECTRONIC COMMUNICATIONS

This application is a continuation of and claims the benefit of priority to U.S. Nonprovisional application Ser. No. 17/395,602, filed on Aug. 6, 2021, which is a continuation of and claims the benefit of priority to U.S. Nonprovisional patent application Ser. No. 16/133,138, filed on Sep. 17, 2018, now U.S. Pat. No. 11,120,028, issued Sep. 14, 2021, which is a continuation of and claims the benefit of priority to U.S. Nonprovisional patent application Ser. No. 14/745,559, filed on Jun. 22, 2015, now U.S. Pat. No. 10,114,869, issued Oct. 30, 2018, which is a continuation of and claims the benefit of priority to U.S. Nonprovisional patent application Ser. No. 14/096,135, filed on Dec. 4, 2013, now U.S. Pat. No. 9,081,824, issued Jul. 14, 2015, which is a continuation of and claims the benefit of priority to U.S. Nonprovisional patent application Ser. No. 13/242,301, filed on Sep. 23, 2011, now U.S. Pat. No. 8,612,477, issued Sep. 23, 2011, which claims the benefit of priority to U.S. Provisional Application No. 61/386,376, filed Sep. 24, 2010, each of which is incorporated herein by reference in its entirety.

The present disclosure relates generally to systems and methods for customizing electronic communications. More particularly, and without limitation, the present disclosure relates to systems and methods for generating and/or displaying customized electronic communications, including personalized communications and/or advertisements.

BACKGROUND

Recent years has seen a dramatic increase in the usage and varied nature of electronic communications. Users may now communicate via email, text message, instant message, SMS, blog postings, chat room postings, online bulletin boards, Twitter Tweets®, social networking chat/postings, calendar-sharing, interactive video games, presence or status updates, rich media (e.g., image) annotations, voice-over-IP conversations, interactive online learning, and many more media, including variations and combinations thereof.

The explosion in electronic communications has led to a corresponding increase in data associated with such communications. However, despite the increased amounts and types of data associated with electronic communications, the data itself is underutilized.

Users may browse the Internet, communicate electronically with other users, perform queries on search engines, and more. But the trail of data they leave behind is under-analyzed and its value is under-appreciated. Further, users' interactions with each other in various electronic communications contexts provide opportunities to link and enrich the data associated the individual users. However, the linking and enrichment have not been performed to the extent desirable for effectively enhancing electronic communications.

Further, the underutilization of electronic communications data has put limitations on the effectiveness of electronic advertising. While electronic advertisements (e.g., online display advertisements) may be targeted to individual users based on, e.g., a user's web browsing history, demographic profile, or geographic location, the data upon which such advertisements are targeted is usually based on a small cross-section of all relevant electronic communications data. For instance, a simple display advertisement may target a user based on what items the user has previously purchased from an online retailer, or currently has in his shopping cart, but will not take into account the user's test messaging history, social network postings, electronic calendar entries, etc. By focusing on only a subset of available data, conventional advertisement targeting techniques are limited in their effectiveness.

The embodiments described in the present disclosure are directed to systems and methods for customizing electronic communications. Such systems and methods may overcome one or more of the problems set forth above. Among other things, the disclosed embodiments include systems and methods for generating and/or displaying customized electronic communications, including personalized communications and/or advertisements.

DETAILED DESCRIPTION

Reference will now be made in detail to the present exemplary embodiments of the present disclosure, examples of which are illustrated in the accompanying drawings. Wherever possible, the same reference numbers will be used throughout the drawings to refer to the same or like parts.

FIG. 1 is a block diagram of an exemplary system 100 for implementing embodiments of the present disclosure. System 100 may include one or more communications clients 101. Communications clients 101 may include, for example, personal computers, laptops, personal digital assistants, mobile telephones, tablet computers, Internet-enabled televisions, and various other types of devices, and/or applications running on such devices. In some embodiments, communications clients 101 may include installed software, or may access web-based software, that facilitates electronic communications. Such software may facilitate, e.g., email (e.g., using SMTP), text messaging, instant messaging, SMS messaging, blog posting, chat room posting, online bulletin board posting, Twitter Tweeting®, social networking chat/posting, calendar-sharing, interactive video games, presence or status updating, rich media (e.g., image) annotating, voice-over-IP conversations, interactive online learning, and various other types of electronic communications, including variations and combinations thereof.

In some embodiments, communications clients 101 may have associated client memory storage 102. Memory storage 102 may be built into communications clients 101 (e.g., in the same physical unit), may be located remotely (e.g., in network area storage), or any combination thereof. In some embodiments, memory storage 102 may store data regarding electronic communications by communications clients 101. For example, memory storage 102 may store transcripts of instant messaging sessions, HTTP cookies from browsing the Internet, user profile and/or password data, calendar entries, to-do lists, contact lists, etc. In some embodiments, data stored on storage devices 102 may be automatically stored without the user's knowledge or permission. In other embodiments, the user may have partial or complete control over what types, and what amounts, of data is stored in storage devices 102. For example, users may have the option of blocking cookies, or declining to save transcripts of instant messaging sessions. In some embodiments, memory storage 102 comprises volatile storage (e.g., RAM, DRAM, SDRAM, etc.), and in other embodiments memory storage 102 comprises more persistent storage (e.g., ROM, PROM, EPROM, EEPROM, flash memory, etc.).

In some embodiments, communications devices 101 may communicate with each other and with other network-based devices, such as communications servers 104 and web servers 106. The communications medium 103 that may facilitate such communications may be the Internet or another type of wide area network, a local area network, metropolitan area network, campus area network, etc.

Communications servers 104 may include servers that facilitate electronic communications between communications clients 101. For example, communications servers 104 may manage distribution of text messaging, SMS, Twitter Tweets®, and other types of communications among communications clients 101. In embodiments where users download applications to engage in electronic communications, servers 104 may facilitate the exchange of communications to and/or from users. In embodiments where users do not necessarily download applications to engage in electronic communications (e.g., where users engage in Web-based communications), servers 104 may run applications that facilitate the communications. in some embodiments, servers may be telecommunications servers and/or switches, Internet service providers, etc. In addition, consistent with some embodiments, each server 104 may include a server, a server system comprising a plurality of servers, or a server farm comprising a load balancing system and a plurality of servers.

In some embodiments, servers 104 may have access to storage devices 105. Storage devices 105 may be situated local to the servers 104 (e.g., in the same physical device), or in a storage area network, network attached storage, a cloud computing arrangement, etc. Similar to storage devices 102, storage devices 105 may record data regarding electronic communications between communications clients 102, and between communications clients 102 and servers 104. The types of data stored on storage devices 105 may include any aspect of an electronic communication, such as the body of a communication, header information (e.g., an email header), time and date stamps, user identifications (e.g., social network user names, email addresses, IP addresses, etc.). Users may have some control over what data, and how much data, is stored on storage devices 105 (e.g., through user preferences for a communications application), or may have limited or no control over the storage of such data.

In some embodiments, system 100 may also include web servers 106. Web servers 106 may include servers capable of receiving users' requests for web content and serving web content to users. Content from servers 106 may be sent to communications devices, or to servers 104, in push or pull operations, or combinations thereof. In some embodiments, servers 106 may be configured to facilitate web-based electronic communications for communications clients 101. For example, servers 106 may be email servers associated with web-based email applications (e.g., Google Gmail™, Microsoft Windows Live Hotmail®, etc.), social network servers associated with social network applications (e.g., Facebook®, MySpace®, Twitter®, etc.), search engine servers (e.g., AOL Search®, Google®, Bing®, etc.), or servers associated with various other types of web-based applications. Servers 106 may also include servers primarily responsible for serving webpages to users. In some embodiments, web servers 106 may communicate with communications servers 104 via a network (e.g., to publish web content in communications messages being handled by communications servers 204). In some embodiments, web servers 106 may be advertising servers, which insert advertisements or other electronic messages into, or in proximity to (e.g., in the margin of a web-based email application), communications messages. In addition, consistent with some embodiments, each web server 106 may include a server, a server system comprising a plurality of servers, or a server farm comprising a load balancing system and a plurality of servers.

In some embodiments, servers 106 may have access to storage devices 107. Storage devices 107, similar to storage devices 105, may be situated locally or remotely to servers 107, and may store various types of data regarding users' communications and web browsing activity. For example, storage devices 107 may store user profiles associated with social network websites, social networking activity (e.g., social networking chat, postings, rich media annotations, etc.), buddy lists, search engine query history, webpage browsing activity, etc. In some embodiments, storage devices 107 may include advertisement databases, as discussed further below. In further embodiments, storages devices 107 may also, or alternatively, contain user profile information and user activity data, as described further below.

Figure 2:
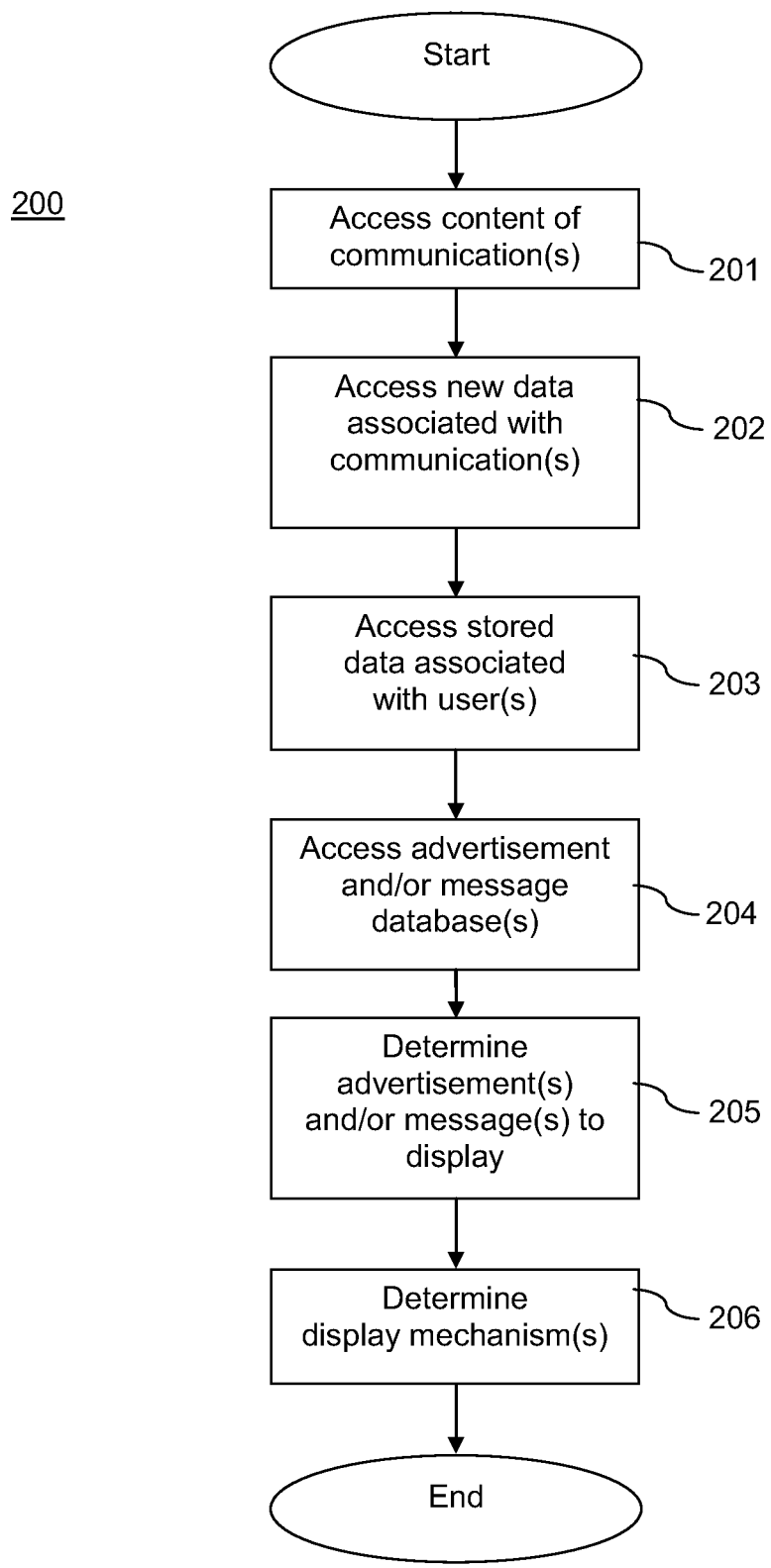

FIG. 2 depicts an exemplary process 200 for implementing embodiments of the present disclosure. In some embodiments, process 200 may include a step 201 of accessing the content of communications. For example, in some embodiments, step 201 may include accessing or receiving data contained within, and/or associated with, electronic communications. Such content may include email headers and bodies, text message content and attachments, blog postings, etc. Embodiments of step 201 are discussed further below. With reference to FIG. 1, process 200 may be performed, e.g., on client devices 101, on servers 104, or on servers 106, or on a combination thereof. In some embodiments, the data accessed or acquired in step 201 may be stored in storage devices 102, storage devices 105, and/or storage devices 107.

In some embodiments, process 200 may also include a step 202 of accessing new data associated with communications. For example, as discussed further below, when users communicate, certain new data about the users may become obtainable, such as the users' locations, the time and date of their communications, local weather patterns and forecasts, etc. Generally, the new data accessed in step 202 may include all data associated with the communications, or with the users, not already known or recorded. With reference to FIG. 1, in some embodiments, the data accessed or acquired in step 202 may be stored in storage devices 102, storage devices 105, and/or storage devices 107.

In some embodiments, process 200 may also include a step 203 of accessing or receiving stored data associated with users. As discussed further below, the stored data may be associated with individual users, with user names, with IP addresses, etc. The stored data may come from users' local memory storage (e.g., a client device's cache, temporary memory, HTTP cookies, stored user profile information, etc.), may come from sources external to the client (e.g., from a web server or its associated databases, from a communications server or its associated databases, etc.), or combinations thereof. Step 203 may also include processing and associating data regarding the content of communications, new data regarding the communications or the users, and stored data regarding the communications or the users. With reference to FIG. 1, in some embodiments, the data accessed or acquired in step 203 may be stored in storage devices 102, storage devices 105, and/or storage devices 107.

In some embodiments, process 200 may also include a step 204 of accessing an advertisement and/or message database. As discussed further below, an advertisement database may include a plurality of advertisements or messages, or pointers that indicate where such advertisements or messages are stored. The advertisements or messages may be indexed and organized according to various criteria and categories, as discussed further below, such as occasion, brand, revenue factors, historical success rates, etc., or any combination thereof. With reference to FIG. 1, in some embodiments, the advertisement and/or message database may be stored in storage devices 102, storage devices 105, and/or storage devices 107.

In some embodiments, process 200 may also include a step 205 of determining which advertisements and/or messages to display. Step 205, as discussed further below, may include selecting an appropriate advertisement and/or message, and/or a plurality of advertisements or messages, based on the processing and associating of data (e.g., data regarding the content of communications, new data regarding communications or users, and stored data regarding communications or users). With reference to FIG. 1, in some embodiments the determinations in step 205 may be made at client devices 101, servers 104, and/or servers 106.

In some embodiments, process 200 may also include a step 206 of determining a display mechanism. For example, as discussed further below, an display mechanism may indicate how a selected advertisement and/or message is to be displayed to a user. The display options provided by display mechanisms may be numerous, including banner display advertisements, text links, pop-up or pop-under windows, opening of new communications windows (e.g., new emails, new text messages, with pre-written content, etc.), audio messages, video displays, etc. With reference to FIG. 1, in some embodiments the determinations in step 206 may be made at client devices 101, servers 104, and/or servers 106.

Figure 3:
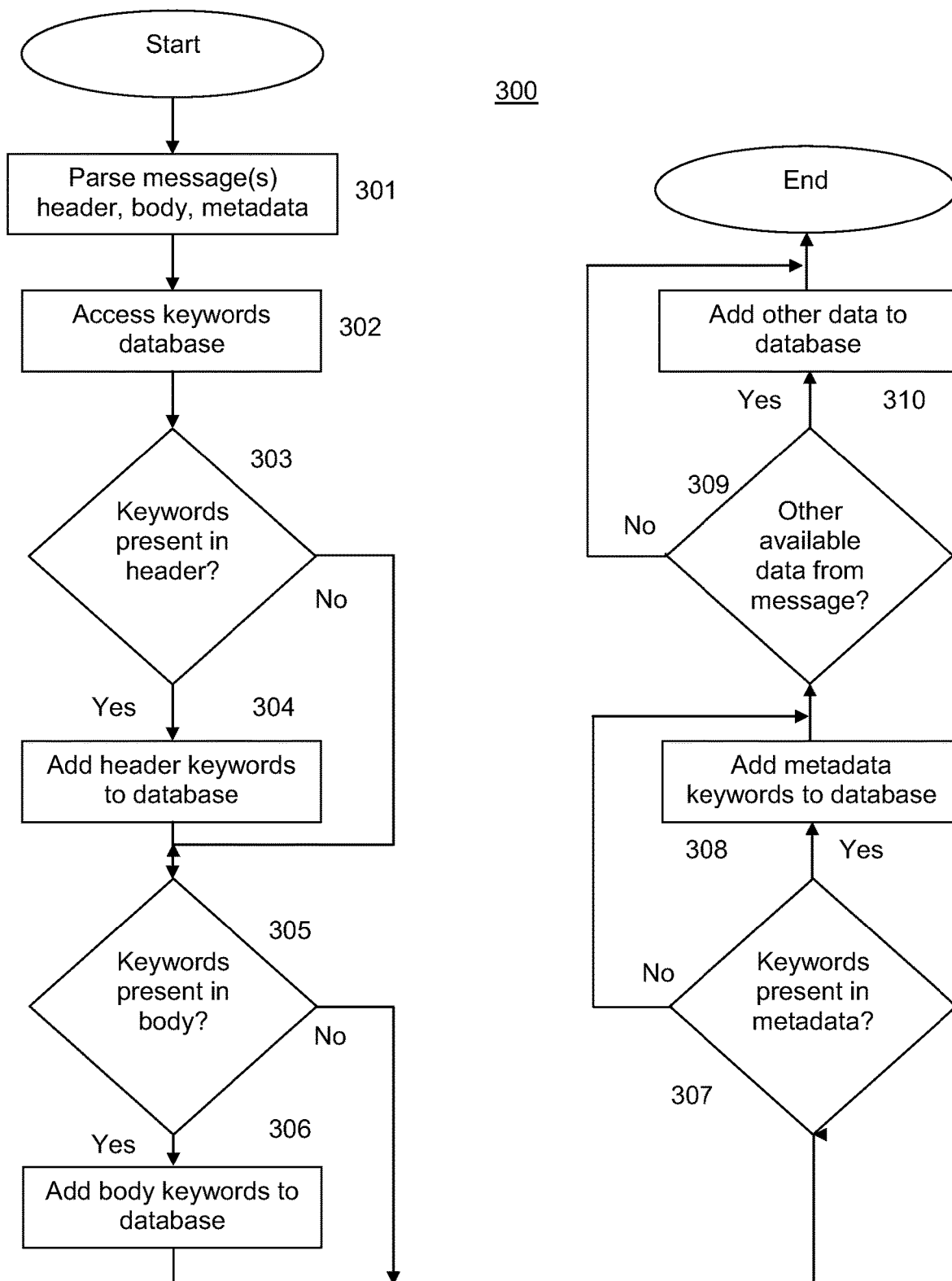

FIG. 3 depicts an exemplary process 300 for implementing embodiments of the present disclosure. In some embodiments, process 300 may be configured and implemented to access and analyze the content of communications messages. With reference to FIG. 1, in some embodiments, some or all of the steps of process 300 may be performed at client devices 101, servers 104, and/or servers 106.

As illustrated in FIG. 3, process 300 may include a step 301 of parsing a message header, body, metadata, etc. For example, an email's header may be parsed to determine information such as the sender, the recipient, the date and time sent and received, the message ID, the subject line, etc. The data included in a message header may be in the form of structured data, or partially-structured data, thus permitting straightforward storage in a database with similar data and linked data. For example, email header data stored in a database may be organized according to any of the header fields (e.g., such fields may function as a database key). Such a database may be linked with other data, and with other databases, according to such header data or other common data fields. In some embodiments, with reference to FIG. 1, the database may be stored at storage devices 102, storage devices 105, and/or storage devices 107.

In addition, or alternatively, step 301 may include parsing the message body, and metadata. The message body of, for example, a text message, may include the substance of a message one user desires to communication to another user. The metadata may include fields such as the IP address of the message sender, data identifying attachments (e.g., images, video files, etc.) sent with the message, security or privacy settings associated with the message or attachments, etc.

Process 300 may also include a step 302 of accessing keywords from a database. For example, a database may include keywords associated with a user, based on the user's previous or current use of the keywords. Keywords may be determined in various ways. For example, words appearing in a user's messages may be compared against a list of words associated with available advertisements. Thus, if a message includes the words "Ford" and "Chevrolet," and a listing of available advertisements includes advertisements from Ford® but not Chevrolet®, "Ford" may be deemed to be a keyword but not "Chevrolet." In some embodiments, moreover, if Ford® has advertisements intended for display, it may want its competitors' names, e.g., Chevrolet®, to be keywords as well. In some embodiments, with reference to FIG. 1, the keywords may be stored in an advertisement database, or in another database, at storage devices 102, storage devices 105, and/or storage devices 107.

In other embodiments, keywords may be chosen as a function of their uniqueness and/or frequency of use in communications messages. For example, a user may use the term "Netflix" in communications messages. By determining how often the term "Netflix" is used in other media (e.g., in newspapers, other users' communications, in general usage, etc.), a level of uniqueness of the word may be determined relative to other words. Also, by determining how often the user uses the term "Netflix" in messages, a frequency of use of the term may be determined. In some embodiments, for example, if the term "Netflix" is determined to be unique, and/or is frequently used by the user in messages, the term "Netflix" may be deemed a keyword. The listing of all keywords associated with a user may change over time, as the users' communications messages change, as advertisers who have available advertisements change, as words change meaning, etc.

In some embodiments, process 300 may also include a step 303 of determining whether there are any keywords included a message's header. If there are any keywords included within the message header (e.g., an exact match or approximate match), such keywords may be added to, or otherwise reflected in, the database in a step 304. For example, the database may keep track of how often the keywords appear in the message headers, at what times and/or dates the keywords appear in the message headers, what other keywords appear in the message headers concurrently, etc. In some embodiments, with reference to FIG. 1, the database may be stored at storage devices 102, storage devices 105, and/or storage devices 107.

In some embodiments, process 300 may also include a step 305 of determining whether there are any keywords present in the message body. Similar to steps 303 and 304, if any keywords are determined to be present in the body (e.g., an exact match or approximate match), the keywords may be stored, or otherwise reflected in, the database in a step 306. In some embodiments, keywords present in a message header may be given more significance than keywords present in a message body. For example, in embodiments where keywords are ranked with scores in terms of their level of interest or value to a given user, keywords appearing in the user's message headers may be given higher scores than keywords that only appear in the user's message bodies. In some embodiments, with reference to FIG. 1, the database may be stored at storage devices 102, storage devices 105, and/or storage devices 107.

In some embodiments, process 300 may also include a step 307, in which it is determined whether any keywords are present in metadata associated with the message. Similar to steps 305 and 306, if any keywords are present in the metadata, such keywords may be included, or otherwise reflected, in the database in a step 308. In some embodiments, with reference to FIG. 1, the database may be stored at storage devices 102, storage devices 105, and/or storage devices 107.

In some embodiments, process 300 may also include a step 309 of determining whether there is any other data associated with the message that may be accessed. For example, such data may include the file name or contents of an attachment to the message, the header and body information associated with other messages in the same thread as the message, information regarding whether the message includes any hyperlinks, brand names, or trademarked terms, etc. If such data is determined to be available in step 309, it may be stored, or otherwise reflected in the database, in a step 310. In some embodiments, with reference to FIG. 1, the database may be stored at storage devices 102, storage devices 105, and/or storage devices 107.

Figure 4:
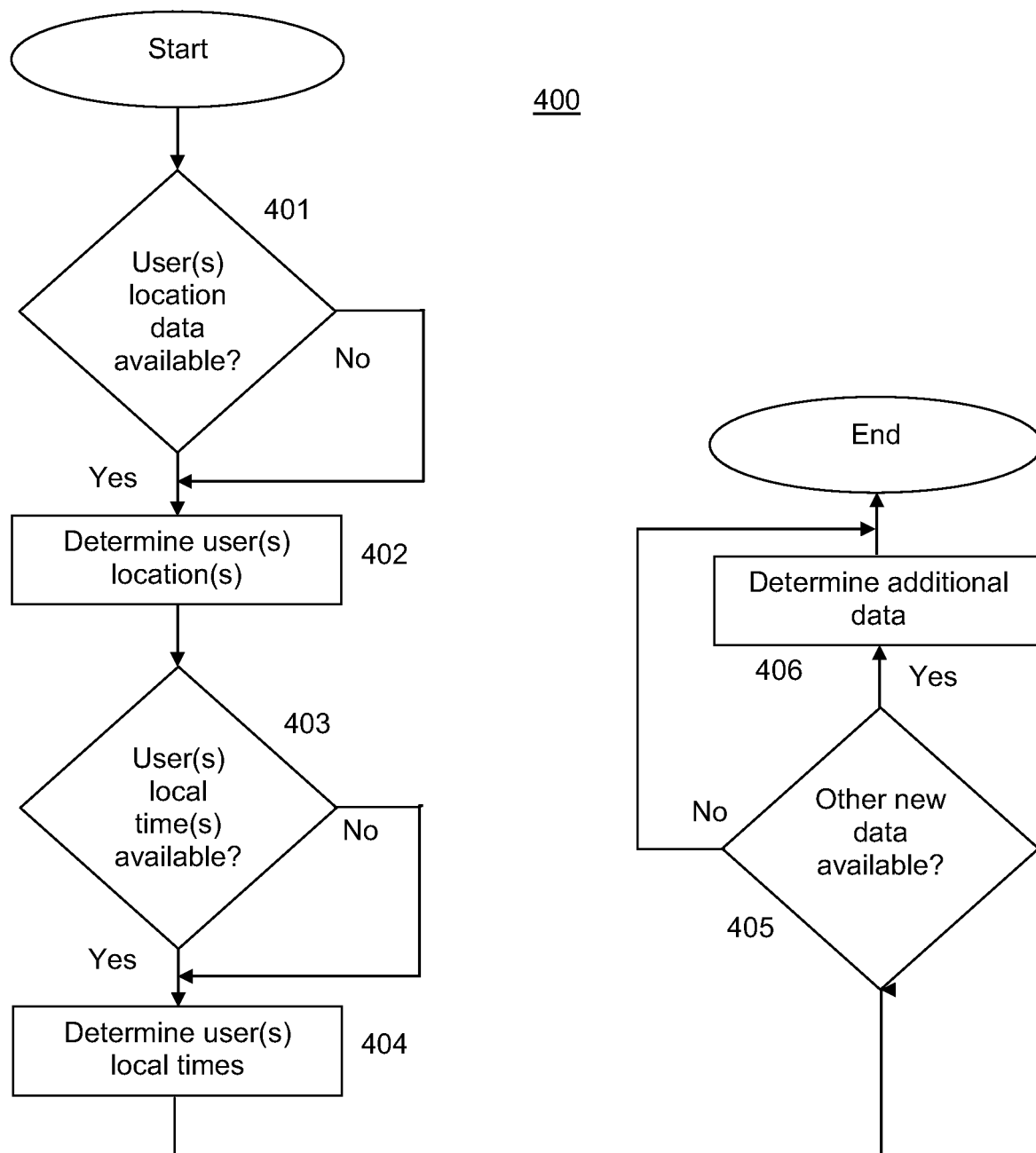

FIG. 4 depicts an exemplary process 400 for implementing embodiments of the present disclosure. In some embodiments, process 400 may be configured and executed to access new data associated with a message or user. In some embodiments, some or all of the steps of process 400 may be performed by client devices 101, servers 104, and/or servers 106.

As illustrated in FIG. 4, in some embodiments, process 400 may include a step 401 of determining whether location data is available for a user. Location data may include any type of data that may assist in determining the current or permanent location of a user. For instance, location data may include a user's IP address or GPS data. In some embodiments, location data may be determined via the HTML5 specification's geolocation feature, etc. Location data may also include data included in a user's profile (e.g., a LinkedIn® profile indicating a user's hometown or current residence), data included in a user's message signature block (e.g., an email signature block with an address and/or phone number), a user's account information associated with an electronic communications service (e.g., a user's billing account associated with a pay-version of a communications application), etc. If such location data is available in step 401, the user's current and/or permanent location may be determined in a step 402.

In some embodiments, process may also include a step 403 of determining whether the user's local time can be ascertained. In situations where the user's location has been determined, the location data may be used to determine the current time in that location. In other embodiments, a message time stamp (e.g., from an email or text message header) may be used to determine the local time associated with a user. If the user's local time is ascertainable in step 403, it may be determined in a step 404.

Process 400 may also include a step 405 of determining whether any other new data is available. New data may include nearly any type of data, and will depend on the circumstances of the message and the types of advertisements to be inserted. As discussed further below, features of the present disclosure provide for sending customized advertisements and/or notifications to users based on the entirety of data regarding the user and their communications messages. In a situation where a user's acquaintance has a birthday coming up, for example, step 405 may include searching for local florists that can deliver flowers, searching for discounts on travel deals if it is known that the person having the birthday lives far from the person receiving the advertisement, local restaurant information, etc. As further examples, in situations where a user is planning on attending a baseball game, step 405 may include gathering weather forecast information, traffic information, etc. If any such new information is available, it may be determined in a step 406. Such other data may be acquired from, e.g., third party websites (e.g., retailer's websites, weather websites, etc.), from structured data sources (e.g., phone directories, local business listings, etc.), etc.

Figure 5:
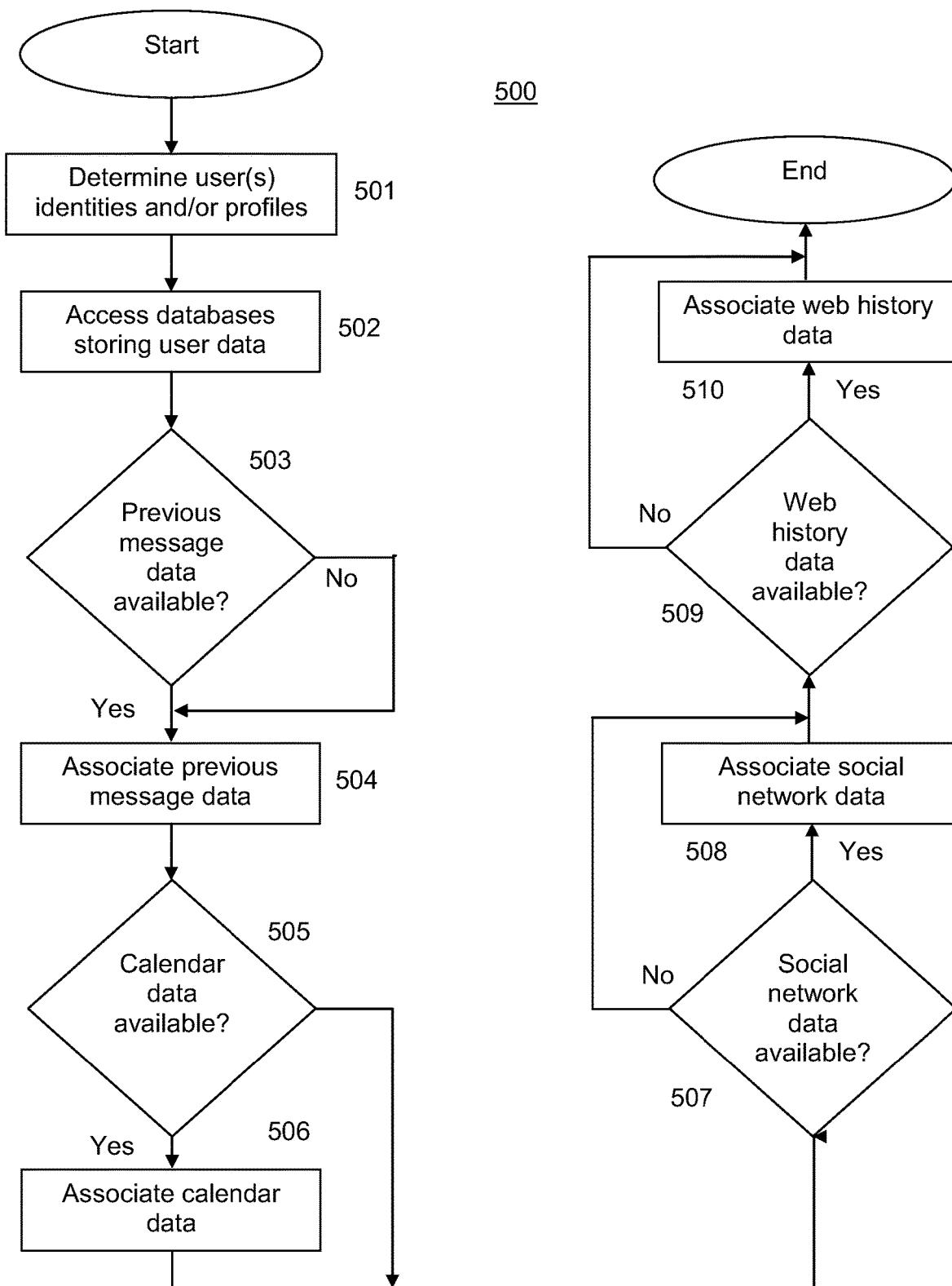

FIG. 5 depicts an exemplary process 500 for implementing embodiments of the present disclosure. In some embodiments, process 500 may be configured and executed to access stored data associated with a user or a communications message. In some embodiments, some or all of the steps of process 500 may be performed at client devices 101, servers 104, and/or servers 106.

As illustrated in FIG. 5, process 500 may include a step 501 of determining the identities and/or profiles of users engaged in communicating. For example, step 501 may include determining a user's email address, screen name, profile ID, given name and family name, unique identifier, etc. In certain embodiments, the identity and/or profile of the user may be used to associate different types of data related to the user. For example, a social networking account may be associated with an email address (e.g., john.doe@email.com), and the same email address may be associated with the user's text messaging account or web-based email account. In such situations, data associated with the user's social networking activity, text messaging activity, and web-based email activity may be linked based on the email address john.doe@email.com (or any other common data field). Such data may be stored in databases, and may be accessed in a step 502.

In some embodiments, process 500 may also include a step 503 of determining whether previous message data associated with the user is available. For example, step 503 may include accessing a database including archives of messages sent to and from the user, or data regarding such previous messages. As indicated above, the messages may be of various types, such as emails, text messages, presence or status updates, etc. If previous message data is determined to be available in step 503, such previous message data may be associated with a new message in a step 504. For example, as discussed above, previous message data may be associated with new message data using a common data field, such as an email address or unique ID.

In some embodiments, process 500 may also include a step 507 of determining whether social network data is available. In addition to social network communications (e.g., status updates, Facebook® postings, rich media file annotations, etc.), social network data may include user profiles associated with social networks. For example, a user's profile on MySpace® or LinkedIn® may include information such as date of birth, hometown, residence, current occupation, previous occupation, a listing of friends or acquaintances, a listing of likes and dislikes, and various other types of profile information. If such data is determined to be available in step 507, such data may be associated with a new communications message, or with a user, in a database in step 508. As discussed above, for example, a common data field may be used to perform the association between the social network data and the other data associated with the user.

In some embodiments, process 500 may also include a step 509 of determining whether web history is available for the user. Web history, for example, may include indications of websites the user has visited, either recently, currently, or in the more distant past. Web history data may include, for example, URLs associated with websites the user has visited, times and dates when the user visited the websites, how long the user spent at the websites, what links the user clicked on the websites, what text or other data the user entered on the websites, etc. The web history data may be available from the user, from web servers that serve the webpages the user has visited, from the user's ISP, and/or from other sources. If web history data is determined to be available, it may be associated with the user and/or the message in a step 510. For example, the association between the web history data and the user and/or the message may be performed by linking the data via a common field in the database.

Figure 6:
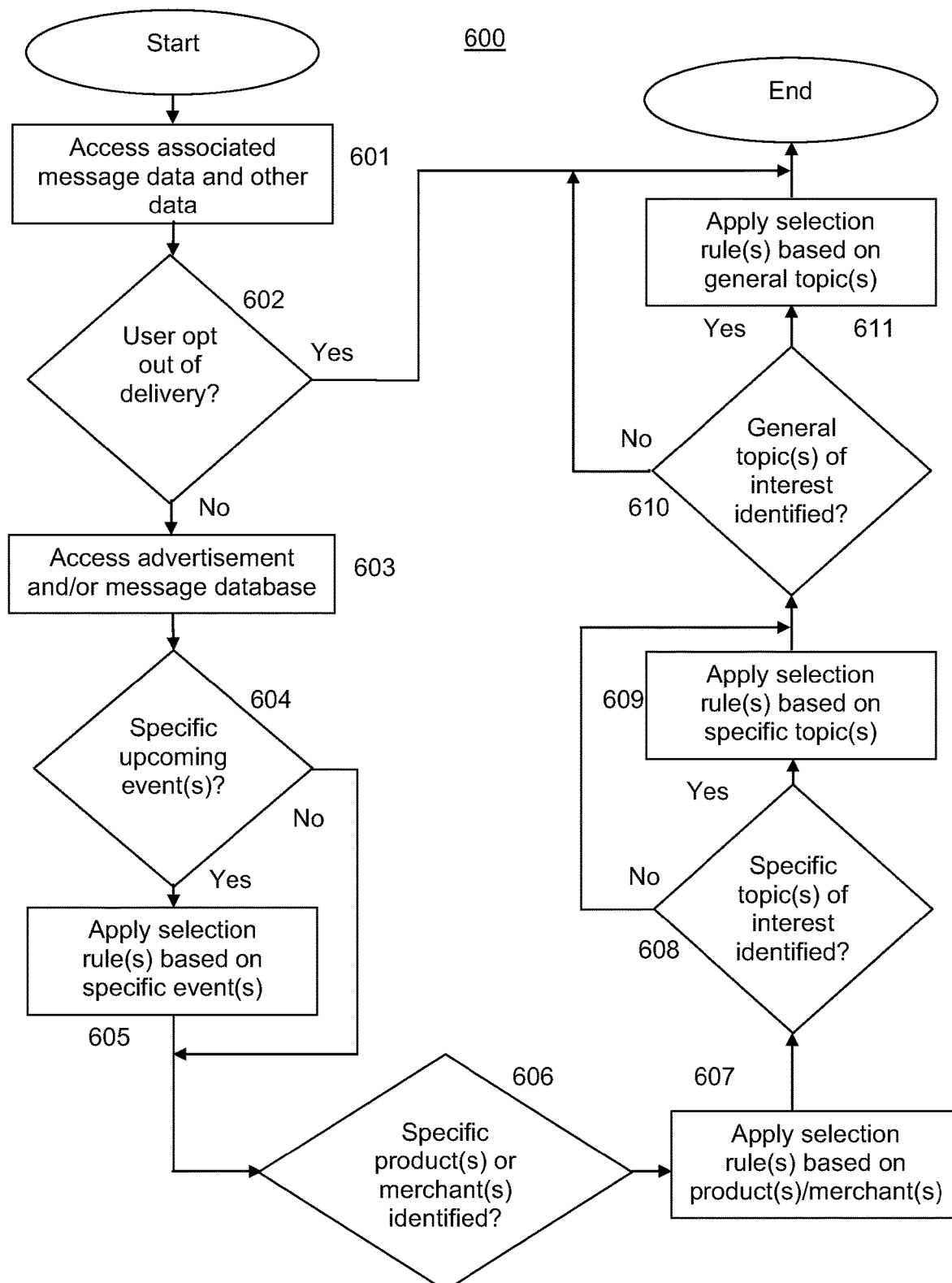

FIG. 6 depicts an exemplary process 600 for implementing embodiments of the present disclosure. In some embodiments, process 600 may be configured and executed to access an advertisement and/or message database and select an advertisement and/or notification to display to a user. In some embodiments, some or all of the steps of process 600 may be performed at client devices 101, servers 104, and/or servers 106.

As illustrated in FIG. 6, in some embodiments, process 600 may include a step of accessing associated data. For example, the various types of data described above (e.g., message data, newly acquired data, stored data, etc.) may be accessed. As described above, the data may be structured and organized according to various common data fields, such as an email address, screen name, social networking pseudonym, unique ID, etc. In some embodiments, the association of data may be performed at storage devices 102, storage devices 105, and/or storage devices 107.

In some embodiments, process 600 may include a step 602 of determining whether the user has opted out of advertisement or message delivery. For example, in some situations, users may be given the option to accept all advertisements, block all advertisements, or accept only some advertisements. Likewise, in some situations, users may be given the option to accept all messages or notifications, block all messages or notifications, or accept only some messages or notifications. Various options may exist for users to determine which advertisements or messages they may receive. For example, non-paying users of an application (e.g., an email, text messaging, or social networking application), may receive more advertisements or messages than paying users. As another example, users may specify that they do not wish to receive adult or mature advertisements or notifications, and such advertisements or notifications may therefore not be displayed to such users.

If the user has not been given an option to block advertisements or messages, or if the user has opted to accept some or all advertisements or messages, process 600 may proceed to a step 603 of accessing an advertisement and/or message database. The advertisement database may comprise a plurality of advertisements, or pointers indicating where such advertisements are stored. Similarly, the message or notification database may comprise a plurality of messages or notifications, or pointers indicating where such messages or notifications are stored.

With reference to FIG. 1, for example, the advertisement or message database may be comprised in storage devices 105 or 107, or in combinations thereof. The advertisement or message database may be organized in various ways to facilitate the selection and delivery of advertisements or messages. For example, the advertisement database may categorize advertisements by occasion (e.g., for birthdays, anniversaries, sporting events, holidays, etc.), by location (e.g., by country, city, town, etc.), by business type (e.g., florist, auto repair, lawn care, child care, etc.), by revenue factors (e.g., cost per click rates, cost per action rates, cost per thousand impressions rates, etc.), by popularity (e.g., ranked in order of most clicked on per number of impressions, etc.), and by various other categories and criteria. The same is true for the message database. The advertisement database may also indicate advertisement delivery mechanisms, as discussed further below. The same is also true for the message database.

In some embodiments, process 600 may also include a step 604 of determining whether there are any upcoming events associated with the user. For example, with access to the data regarding the user and his message history, various types of upcoming events can be determined. A user communicating by text message with another user, for example, may use the word "birthday." The word "birthday" may or may not be a "keyword" as described above. In any case, upon detecting the word "birthday" in the text message, data regarding the user may be accessed to determine whether the user has an upcoming birthday. Also, data regarding the other participant in the text messaging session may be accessed, if available, to determine whether that participant has an upcoming birthday. If either user has an upcoming birthday, the upcoming birthday may be deemed an upcoming event in step 604.

As another example, if a first user is communicating via email with a second user, and the words "dinner" and "movie" appear in the email header and/or body, and/or in previous emails between the users, it may be determined that one or both of the users may be planning a social outing involving a dinner and a movie. In such a situation, the upcoming dinner and movie may be deemed an upcoming event in step 604.

In some embodiments, process 600 may also include a step 605 of applying advertisement or message selection rules based on the specific event identified in step 604. For example, in some embodiments, different types of upcoming events may be associated with different categories of advertisements or messages. As discussed above, for example, one category of advertisements in the advertisement database may be "birthday" advertisements. The same is true for messages. In the exemplary situation described above, where two users exchange text messages about a "birthday," the specific event may trigger an ad or message selection rule that favors selection of advertisements or messages in the "birthday" category. For example, this specific event my trigger one or more advertisements for birthday cards, flowers, cakes, etc.

Some or all advertisements in the advertisement database may have an associated score (e.g., 0-100). The default score for any given advertisement may be, e.g., 50. If an upcoming event is determined to be a "birthday," advertisements in the advertisement database falling within the "birthday" category may receive an increased score (e.g., an increase of 30, bringing their score up to 80 from the default of 50). In some embodiments, the increase to the scores within a given category may be greater or smaller depending on various factors, such as the number of advertisements within the category, the breadth of the category vis-à-vis other categories (e.g., the category of "home improvement" is broader than "skylights"), etc. In some embodiments, the increase in scores, or the default scores themselves, may also be determined according to revenue factors, such as cost-per-click rates, cost per action rates, cost per thousand impressions, etc.

The above features are not limited to advertisements in the advertisement database. The same or similar scoring techniques can also be used in combination with messages in the message database. In some embodiments, an advertisement database and a message database may be stored in the same physical or logical medium (e.g., storage devices 102, 105, and/or 107), and in other embodiments, the advertisement database and message database may be stored separately.

In some embodiments, process 600 may also include a step 606 of determining whether a user's communication mentions any specific products or merchants. For example, in the example given above about users sending emails about a "dinner" and "movie," in some situations the users may also mention the name of a specific restaurant (e.g., "Morton's,") or a particular movie (e.g., "The Incredibles"). In situations like this, where users mention specific product or service names, an advertisement or message selection rule may be applied based on the specific references to the product or service in a step 607. For example, in step 607, the advertisement database may be queried to determine whether any advertisements are sponsored by Morton's The Steakhouse™ or the movie (or promoter of the movie) The Incredibles. In addition, or alternatively, the advertisement database may be queried to determine whether any advertisements relate to steak restaurants or movies generally. In some embodiments, where advertisements in the advertisement database are given scores, a larger score increase may be applied to an advertisement sponsored by a company specifically referenced in the user's message compared to a company not specifically referenced. In other embodiments, competitors may specifically request that their ads be displayed when their competitors' names are mentioned in messages. Thus, for example, Coca Cola® may request that its advertisements be displayed to users whose messages include the word Pepsi®. In some embodiments, the scores determined in step 607 may be cumulative of the scores determined in step 605. Thus, for example, a larger score increase may result when a user's message includes both a specific category of advertisement and a specific product, service, or company, compared with situations where either no specific category is identified or no specific product, service, or company is identified.

In some embodiments, process 600 may also include a step 608 of determining whether any specific topics are identified from the user's message. For example, two users may be talking in a chat room about politics. Previous messages between the users, as recorded in a database, may indicate that the users talk about specific political candidates, elections, campaign buzzwords, etc., but the users do not mention specific products, companies, or advertisement or message themes. In step 608, the specific topic of interest of "politics" may be identified. Accordingly, in a step 609, an advertisement or message selection rule may be applied based on the specific topic of interest of "politics." For example, the advertising database may be queried to determine whether any advertisers have requested their advertisements to be displayed when users' messages relate to the topic of politics. In such a situation, such advertisers' advertisements may be selected, or the scores associated with such advertisements may be increased. Further, as discussed above with respect to steps 605 and 607, the scores adjusted in step 609 may be adjusted cumulatively in view of adjustments already made in steps 605 and 607.

In some embodiments, process 600 may also include a step 610 of determining whether the user's message, and/or previous messages, indicate a general topic of interest. For example, in some situations, a user's messages will not indicate any specific upcoming events, specific products, services, or companies, or specific topics of interest. In such a situation, a general topic of interest may be identified with respect to the messages. For example, a general topic of interest of a rich media annotation (e.g., an image annotation in Facebook®), may be determined based on other annotations made by the user, or other users, to neighboring images. For instance, if a user's image annotation merely includes the name of a person appearing in the image, it may not be possible to determine a specific topic of interest, product name, etc., with respect to the annotation. But if nearby images also contain annotations, and the annotations mention general topics (e.g., football, school, movies, travel, etc.), a general topic of interest may be determined (or guessed) with respect to the annotation by the user. Based on the identified general topic of interest, an advertisement or message selection rule may be applied in a step 611. As discussed above, for example, step 611 may involve adjusting scores associated with advertisements in the advertisement database or messages in the message database. Step 611 may also be performed cumulatively with, e.g., steps 605, 607, and 609, such that the scores are cumulatively adjusted at each step.

Figure 7:
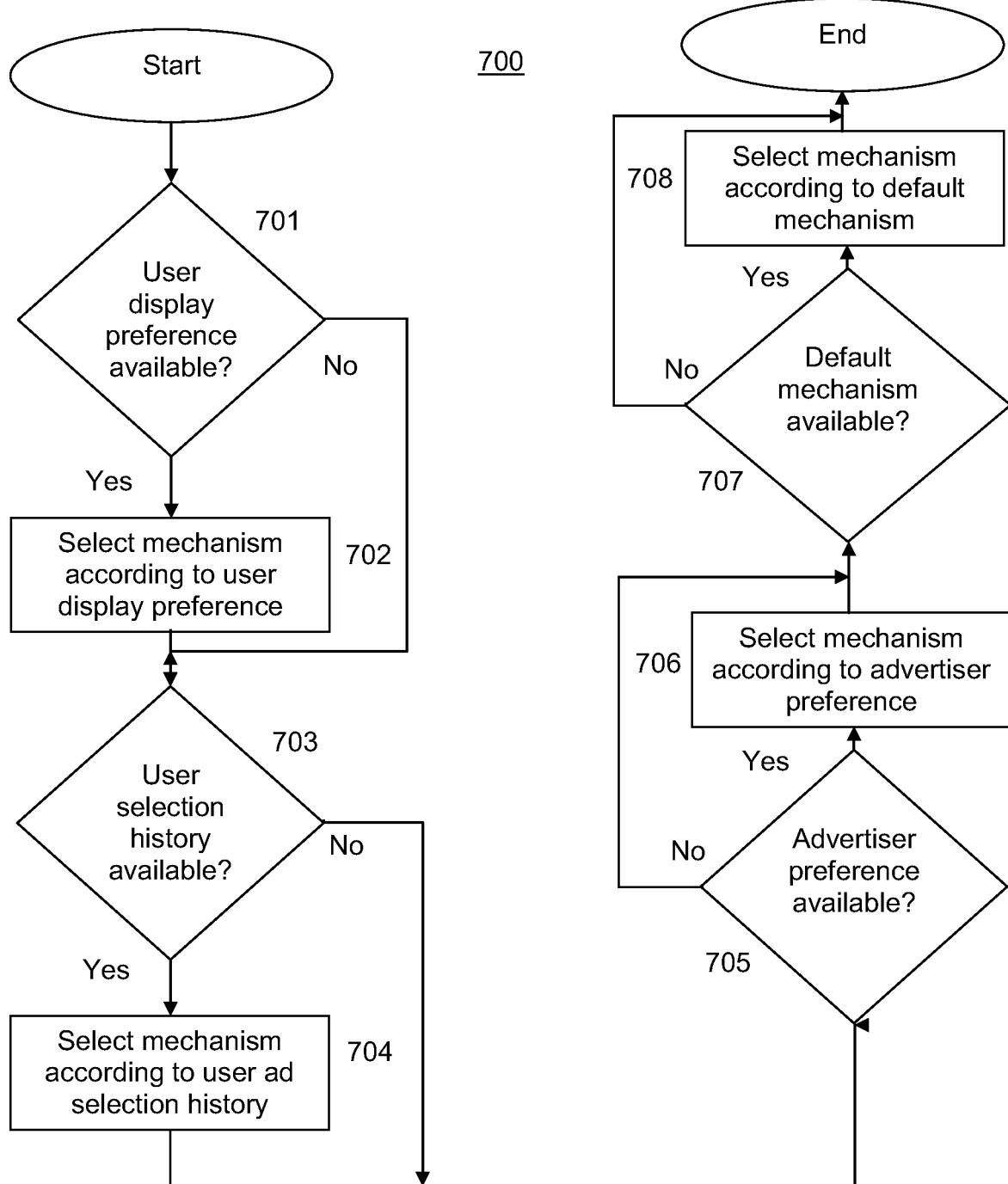

FIG. 7 depicts an exemplary process 700 for implementing embodiments of the present disclosure. In some embodiments, process 700 may be configured and executed to determine a display mechanism. In some embodiments, some or all of the steps of process 700 may be performed at client devices 101, servers 104, and/or servers 106.

As illustrated in FIG. 7, process 700 may include a step 701 of determining if a user has display preferences with respect to display mechanisms. Such user preferences may include, for instance, a preference of never receiving pop-up advertisements, but having no objection to banner ads. Such user preferences may be set in various ways, such as in an Internet browser, in a preferences menu of a communications application, in a preferences menu of a user's mobile telephone, etc. If a user has a preference not to receive advertisements or messages via a certain mechanism, the user's preference may be honored in a step 702, depending on the needs and business model of the entity serving the advertisements or messages to the user. Likewise, if the user has a preferred display mechanism, that mechanism may be chosen in step 702.

In some embodiments, process 700 may also include a step 703 of determining whether a user's selection history is available. For example, step 703 may involve querying a database including records of which advertisements or messages the user has selected (e.g., clicked on), and which mechanism was used when the user selected the advertisements or messages. In some embodiments, for example, the user's selection history may indicate that the user clicked on 15% of banner advertisements, 5% of text-link advertisements, 4% of video advertisements, and 0% of pop-up advertisements. In such a scenario, banner advertisements may be the preferred advertisement delivery mechanism for the user, and in step 704, such a mechanism may be selected for the user. In some embodiments, the user will receive advertisements displayed only according to the preferred mechanism, and in other embodiments the user will receive advertisements displayed according to other mechanisms as well. Similarly, this may apply to the display of messages or notifications.

In some embodiments, process 700 may also include a step 705 of determining whether advertisers or other entities have indicated preferences regarding advertisement or message delivery mechanisms. For example, certain advertisers may request only one form of advertisement delivery mechanism (e.g., pop-under advertisements), while other advertisers may have five different mechanisms in order of their preference. In some embodiments, advertisers may be willing to pay more or less (e.g., per impression, per click, etc.) for certain types of delivery mechanisms than others. Of course, multiple delivery mechanism may be used simultaneously as well (e.g., a banner advertisement displayed while an audio message plays). Advertiser preferences for advertisement display mechanisms may be stored, for example, in the advertisement database. If an advertiser preference is determined to exist, it may be honored in a step 706 and the corresponding mechanism may be selected.

In some embodiments, process 700 may also include a step 707 of determining whether a default display mechanism is to be used. For example, if it is determined that a user has no preference as to the display mechanism and has no selection history, and the advertiser or other responsible entity has no preference either, a default display mechanism may be chosen. For example, the default mechanism may be 100% banner advertisements, or may be chosen by cycling through the different available advertisement display mechanisms, etc. The default display mechanism may be selected in a step 708.

In view of the foregoing discussion, the following are several examples of how the various types of data discussed above may be used to customize electronic communications, including personalized communications and/or advertisements for users.

As one exemplary situation, John may communicate with Jane by email. According to John's contact list, Jane is John's wife. This information may be determined, for example, with reference to process 500, as described above. For instance, process 500 indicates various forms of stored data (e.g., previous message data, calendar data, social network data, web history data, etc.) that may be accessed from a database. In addition to these types of stored data, the database may include John's contact list, in which he identifies Jane as his wife. Alternatively, the social network data stored in association with John and/or Jane may indicate their relationship as husband and wife. As another possibility, Jane's status of John's wife could be determined as new information in accordance with process 400, as described above. For example, John's contact list associated with his email client may be accessed, and may indicate that Jane is John's wife.

Either with or without prompting, Jane's social network data may be accessed. For example, in accordance with process 500, Jane's stored social network data may be accessed from a database. In other embodiments, her social network data may be determined by checking her social network data in real time from a website that hosts her social network page (e.g., MySpace®). Upon accessing Jane's social network data, it may be determined that Jane's birthday is two weeks away. For example, Jane's profile may indicate that her birthday is two weeks away. Alternatively, her billing account associated with one of her accounts (e.g., her email account, her social networking account, etc.) may indicate her birthday.

John's and Jane's locations may also be determined. For example, their IP addresses, or HTML5 geolocation data, may be used to determine their current location. Also, their social network data may indicate their hometown or residence. Based on this information, it may be determined that John and Jane live in San Francisco.

While John is reading an email from Jane, or while John is composing an email to Jane, a personalized message may be provided to remind John about Jane's birthday. Such a reminder may also include an advertisement, or in some embodiments it may simply be a reminder without any advertisement. In embodiments where John is presented with an advertisement, the advertisement may be selected based on the knowledge that Jane's birthday is two weeks away, John and Jane both live in San Francisco, and Jane is John's wife.

As described above, numerous other types of data may also influence which advertisement or message is selected to be displayed to John. For example, if John and/or Jane's social network profiles indicate that John and/or Jane is a fan of Beethoven, a search may be performed of local concert halls for performances of Beethoven music. If such concerts are found, a message or advertisement may be displayed for John from a local concert hall or concert ticket purveyor.

As another example, if John and Jane's previous emails (or text messages, blog postings, etc.) indicate that John and/or Jane like the San Francisco 49'ers, a search may be performed for tickets to a 49'ers game. In addition, for example, if a 49'ers game is determined to occur on or around Jane's birthday, a search may be made for local weather conditions on the day of the game. If the weather is likely to be rainy, the advertisement involving the 49'ers tickets may not be displayed. Instead, a search of local restaurants may be performed, and local restaurants proposed to John in a message or advertisement.

In the foregoing embodiments, the customized communications displayed to John may be advertisements paid for by specific companies, and/or they may be messages that simply provide alerts or notifications of upcoming events and potential things to do that are not paid for by any particular advertiser.

Further, if John and Jane are determined to have children, they may be presented with advertisements for or messages related to babysitters. For example, John and Jane's prior communications may include the words, e.g., "kids," or their contact lists or social network pages may indicate that they have children. Based on such information, it may be determined that a babysitter would be a useful service for John and Jane on the night of Jane's birthday. Accordingly, advertisements or notifications may be displayed to John indicating that he may want to hire a babysitter, or advertising the services of a local babysitting agency.

In addition to the foregoing discussion, the concurrently filed Appendix A (15 pages) is hereby incorporated by reference in its entirety. Appendix A is part of this disclosure and provides further examples and embodiments.

It will be apparent to those skilled in the art that various modifications and variations can be made to the exemplary embodiments disclosed herein. It is intended that the examples be considered as exemplary embodiments only, with a true scope of the disclosed embodiments being indicated by the following claims and their equivalents. Further, it is to be understood that while the foregoing discussion may have referenced singular components (e.g., servers, databases, devices) in some instances, such components may be implemented using a plurality of such components to achieve similar to additional functionality. Further, it is to be understood that the above described hardware components (e.g., servers, communications devices, storage media, etc.), may be tangible hardware components, comprising memory devices (e.g., RAM, ROM, etc.), and may be configured to perform the functions and processes described above.

What is claimed is:

1. A system for displaying electronic content to a user based on electronic communication data, comprising:
   a data storage device storing instructions for displaying electronic content to a user in an electronic storage medium; and a processor configured to execute the instructions to perform a method including:

receiving, by a server processor, first communication data comprising electronic communication between a first user device of a first user and a second user device of a second user;

determining, by the server processor, one or more keywords from the first communication data based on a function of word uniqueness or word frequency;

based on the determined one or more keywords, determining a first selection of electronic content and a corresponding score, the corresponding score based on one or more of a general topic of interest, specific topics of interest, the first communication data, and a profile of the first or the second user; and based on the determined score of the first selection of electronic content, sending instructions to the first user device for displaying the first selection of electronic content.

2. The system of claim 1, wherein the one or more specific topics of interest include an upcoming event.

3. The system of claim 1, wherein the one or more specific topics of interest include one of a product name and a merchant name.

4. The system of claim 1, further comprising:
determining the first selection of electronic content based on one or more general topics of interest, one or more specific topics of interest, and the first communication data.

5. The system of claim 1, wherein one or more content selection rules increase a default score associated with the first selection of electronic content based on one or more of the general topics of interest and the specific topics of interest.

6. The system of claim 5, wherein one or more of the content selection rules identify one of an advertisement and a message based on one or more of the general topics of interest and the specific topics of interest.

7. The system of claim 1, wherein a plurality of content selection rules identify electronic content based on electronic communications from one or more other users to the first user.

8. The system of claim 1, wherein a plurality of content selection rules identify electronic content based on communications from one or more other users who are associated with the first user.

9. The system of claim 1, wherein a plurality of content selection rules identify electronic content based on a real-time location of the first user.

10. The system of claim 1, wherein a plurality of content selection rules identify electronic content based on the first profile of the first user.

11. The system of claim 1, further comprising:
determining a default display by cycling through one or more available display mechanisms when there is no electronic communication data.

12. A computer-implemented method for displaying electronic content to a user based on electronic communication data, the method comprising the following operations performed by at least one processor:

receiving, by a server processor, first communication data comprising electronic communication between a first user device of a first user and a second user device of a second user;

determining, by the server processor, one or more keywords from the first communication data based on a function of word uniqueness or word frequency;

based on the determined one or more keywords, determining a first selection of electronic content and a corresponding score, the corresponding score based on one or more of a general topic of interest, specific topics of interest, the first communication data, and a profile of the first user or the second user; and based on the determined score of the first selection of electronic content, sending instructions to the first user device for displaying the first selection of electronic content.

13. The computer-implemented method of claim 12, wherein the one or more specific topics of interest include an upcoming event.

14. The computer-implemented method of claim 12, wherein the one or more specific topics of interest include one of a product name and a merchant name.

15. The computer-implemented method of claim 12, further comprising:
determining the first selection of electronic content based on one or more general topics of interest, one or more specific topics of interest, and the first communication data.

16. The computer-implemented method of claim 12, wherein one or more content selection rules increase a default score associated with the first selection of electronic content based on one or more of the general topics of interest and the specific topics of interest.

17. The computer-implemented method of claim 16, wherein one or more of the content selection rules identify one of an advertisement and a message based on one or more of the general topics of interest and the specific topics of interest.

18. The computer-implemented method of claim 12, wherein a plurality of content selection rules identify electronic content based on electronic communications from one or more other users to the first user.

19. The computer-implemented method of claim 12, wherein a plurality of content selection rules identify electronic content based on communications from one or more other users who are associated with the first user.

20. The computer-implemented method of claim 12, wherein a plurality of content selection rules identify electronic content based on a real-time location of the first user.

* * * * *